United States Patent [19]

Brinegar

[11] Patent Number: 4,865,357
[45] Date of Patent: Sep. 12, 1989

[54] METAL PIPE COUPLING TO ACCOMMODATE A DESIRED ANGLE OF CONNECTION BETWEEN DRAINAGE PIPE SECTIONS

[75] Inventor: O'Dell Brinegar, Middletown, Ohio

[73] Assignee: Contech Construction Products Inc., Middletown, Ohio

[21] Appl. No.: 234,564

[22] Filed: Aug. 22, 1988

[51] Int. Cl.$^4$ .............................................. F16L 9/14
[52] U.S. Cl. .................................... 285/55; 285/226; 285/373; 285/419; 285/424; 285/903; 29/454
[58] Field of Search ................ 285/226, 903, 55, 424, 285/373, 419; 29/454

[56] References Cited

U.S. PATENT DOCUMENTS

| | | | |
|---|---|---|---|
| 1,259,233 | 3/1918 | Hartman | 285/903 X |
| 1,652,703 | 12/1927 | Cushman | 285/903 X |
| 3,336,950 | 8/1967 | Fochler | 285/226 X |
| 3,501,179 | 3/1970 | Boynton et al. | |
| 4,437,691 | 3/1984 | Loney | 285/903 |

FOREIGN PATENT DOCUMENTS 1295520  5/1962  France ................................ 285/226

OTHER PUBLICATIONS

Brochure by Armco Sewer Systems Joints and Appurtenances, Title: Armco's H-4 Hugger Band, 1 page.
Brochure by Armco Sewer Systems Joints and Appurtenances, Title: Armco's H-10 Hugger Joint, 1 page.
Brochure by Armco Hel-Cor CL Title: Concrete–Lined Corrugated Steel Pipe, 8 pages.

Primary Examiner—Dave W. Arola
Attorney, Agent, or Firm—Wood, Herron & Evans

[57] ABSTRACT

A rigid metal pipe coupling for joining pipe sections comprises a sheet of metal having opposite edges for rolling into a generally cylindrical rigid sleeve. The metal sheet has an integrally formed expansible and contractible means formed intermediate the ends of the sheet, said means is adapted after rolling into said sleeve and under the action of a predetermined force to expand and contract thereby allowing said sleeve to permanently bend and accommodate a desired angle of connection between pipe sections.

10 Claims, 2 Drawing Sheets

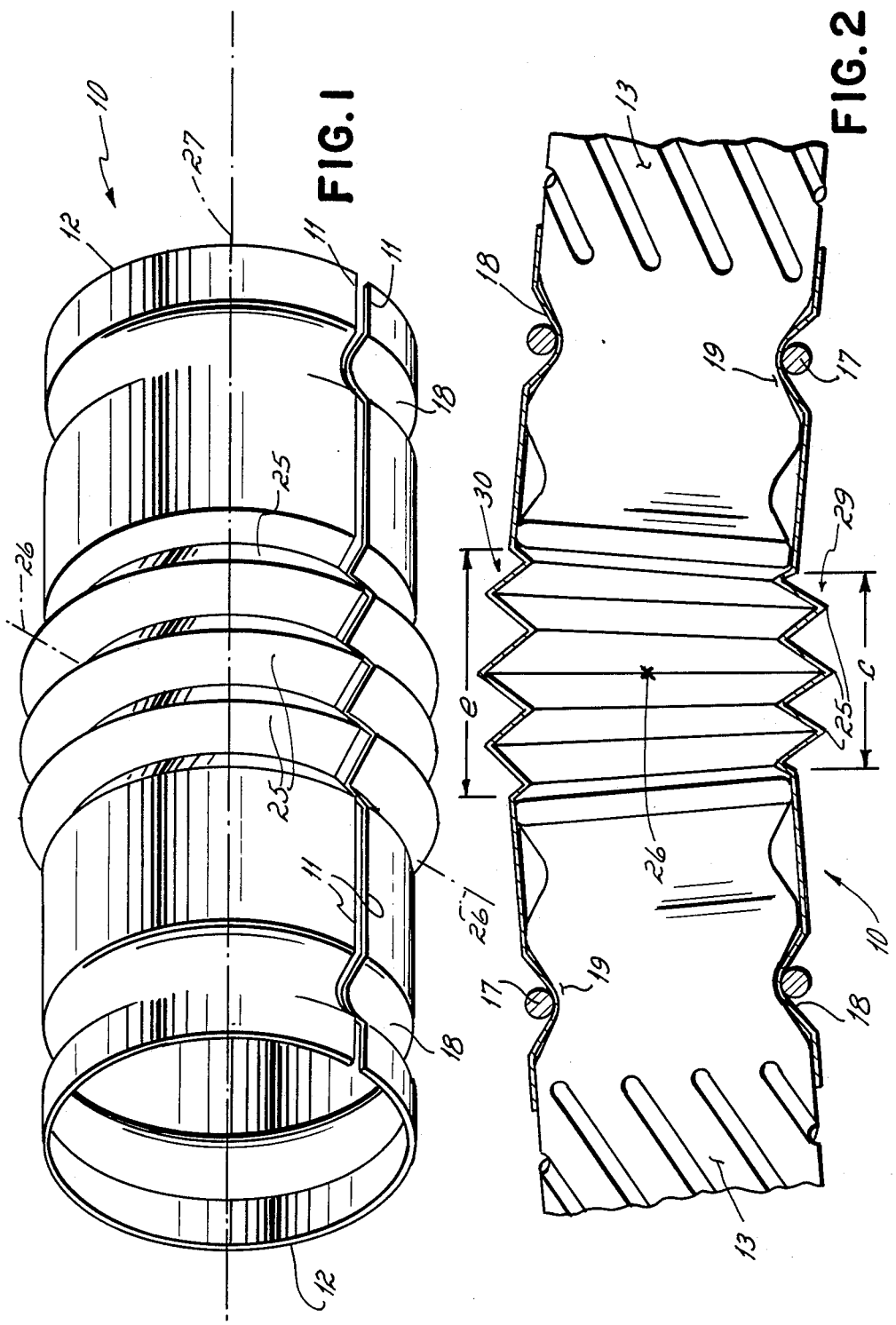

METAL PIPE COUPLING TO ACCOMMODATE A DESIRED ANGLE OF CONNECTION BETWEEN DRAINAGE PIPE SECTIONS

FIELD OF THE INVENTION

This invention relates to a rigid pipe coupling and, more particularly, to a rigid pipe coupling that is bendable to accommodate a desired angle of connection between joined ends of helically corrugated pipe.

BACKGROUND OF THE INVENTION

Corrugated steel pipe sections can be used to form pipeline drainage systems along or beneath highways, or for various other construction projects where diversion of water flow or drainage of runoff is required. Depending upon the size and nature of the project, the dimensions of the corrugated steel pipe that are used to form the drainage system may vary. Steel corrugated pipe sections of this type range in diameter from 36" to 144", are made in lengths of up to 24', and have a thickness of 0.168", or 8 gauge. High strength, helically corrugated pipes of this type may be made from galvanized steel or aluminized steel and lined on the inside with a machine applied, dense, high strength concrete lining to a minimum of ⅛ inch thickness above the crest of the corrugation.

Couplings for joining sections of pipe must meet the same performance requirements as the individual sections of pipe. The connection must be soil tight and although the joint need not be watertight, it must not permit water to flow out at such a volume and velocity as to cause undue settling or erosion of the soil surrounding the pipe. If the pipe is to be situated below the water table, the pipe joints must also preclude the ingress of water. Furthermore, pipe joints must be sufficiently rigid to maintain the proper alignment of the joined pipe sections. Varying pressures on the ground above the joined pipe sections must not adversely affect this desired alignment.

U.S. Pat. No. 3,501,179, in the name of Jerold H. Boynton et al, provided a coupling which met these performance requirements for joining sections of helically corrugated pipe having an angle of connection of 180°, or a straight line connection. Boynton disclosed a sleeve type coupling sized to receive the ends of the pipe sections to be joined. The Boynton coupling also provided annular corrugations of substantially the same pitch, size and depth which were seated on an annular corrugation at the end of each of the pipe sections.

The Boynton patent has proved more than adequate for straight line connections. However, due to ground contour and the accommodation of optimum drainage routes, most pipeline applications require a number of angled connections between pipe sections. The problems normally encountered in joining sections of helically corrugated pipe become further complicated when the pipe sections must be connected at an angle.

In the past, angled connections have been made at the job site by a time consuming process requiring substantial cutting and welding of each of the separate pipe sections. The separate sections of pipe must be repeatedly re-oriented to access the circumferential edges of the pipes in order to obtain a proper seal about the entire circumferential surface of connection. This re-orientation often requires some longitudinal movement of one pipe section with respect to the other, a difficult maneuver when connecting pipe sections that have a large diameter or a paved bottom. Regardless of the dimensions or composition of the pipe section, a connection process of this type results in delay, additional expense and becomes increasingly difficult under adverse weather conditions.

Couplings formed in the field in this manner will vary according to a number of factors, including the angle of connection, the width of the pipe sections, the depth of the pipeline, access to the circumferential surface of connection, the surrounding soil conditions, etc. Due to variation of these factors along the length of any given pipeline, the quality of the connections along the pipeline will vary, thus frustrating attempts to provide uniform structural integrity. Moreover, variations in the quality of connections along the route of the pipeline results in inconsistencies in the pipeline's ability to withstand wear and tear, thereby frustrating troubleshooting and compounding difficulties associated with subsequent maintenance.

In view of the disadvantages associated with present methods and devices for coupling pipe sections at varying angles of connection, there is a definite need to develop means for forming consistent, high quality connections of this type that do not require multiple cuts and welds at the job site, nor difficult and time consuming maneuvering of the pipe sections to achieve the orientation necessary for performing such cuts and welds.

SUMMARY OF THE INVENTION

The present invention overcomes the above-mentioned disadvantages of the present state of the art for joining sections of drainage pipe at a desired angle of connection by providing a rigid high strength metal coupling. The metal coupling comprises a sheet of metal having opposite edges for rolling into a generally cylindrical rigid sleeve. The sheet has integrally formed expansible and contractible means intermediate the ends of the sheet. After rolling into a sleeve, the expansible and contractible means renders the sleeve bendable under the action of a predetermined force to overcome the sleeve rigidity and take on a permanent rigid shape to accommodate a desired angle of rigid connection between the two pipe sections.

In one embodiment of this invention, accordion-like folds or ribs in the sheet form the expansible and contractible means of the rigid coupling. The accordion-like folds allow either expansion or contraction to take place when a force is applied in order to bend the rigid coupling to a desired direction. Necessarily, expansion on one side of the coupling will require a corresponding contraction on the opposite side.

To form the rigid coupling of this invention, a metal sheet of uniform width is rolled to form a generally cylindrical rigid sleeve, with the rolled edges nearly abutting or even overlapping. The ends of the pipe sections to be connected are placed within the respective ends of the coupling. The rolled sleeve is then tightened about the ends of the pipe section to cause the edges to overlap and completely encircle the outer circumference of the inserted pipe sections. The ends of the coupling are then secured in this tightened position by bands. With the ends of the rigid pipe coupling secured to the ends of the joined pipe sections, either of the pipe sections may be used as a lever to apply a force which overcomes the initial rigidity of the expansible and contractible means, thereby permitting the coupling to bend to the desired angle.

According to one feature of the present invention, the coupling allows pipe sections to be routed at a desired angle without requiring cutting or welding of the ends of the pipe sections during installation.

Another feature contemplated by the present invention is that the coupling can be used to accommodate various angles of connection utilizing the same simple method of connection. Thus, convenient installation is provided by a pipe coupling that can be bent at the job site to fit the specific requirements of each connection.

In accordance with a further feature contemplated by the present invention, inconsistencies in the structural integrity of the connection along the length of the pipeline are reduced. This is true regardless of whether or not the sections of pipe are made from aluminized steel or galvanized steel with or without a concrete lining.

The above features and advantages of the present invention will be better understood with reference to the accompanying figures and detailed description. It will also be understood that the particular drawings illustrating the invention are exemplary only and not to be regarded as limitations of the invention.

BRIEF DESCRIPTION OF THE DRAWINGS

Reference is made to the accompanying figures which show illustrative embodiments of the present invention from which the novel features and advantages will be apparent.

FIG. 1 is a perspective view of a metal sheet rolled into a sleeve with nearly abutting edges used to form the pipe coupling of this invention.

FIG. 2 is a cross-sectional view of pipe coupling of this invention where the angle of connection between two separate pipe sections varies from 180°.

DETAILED DESCRIPTION OF THE INVENTION

Figure 3:
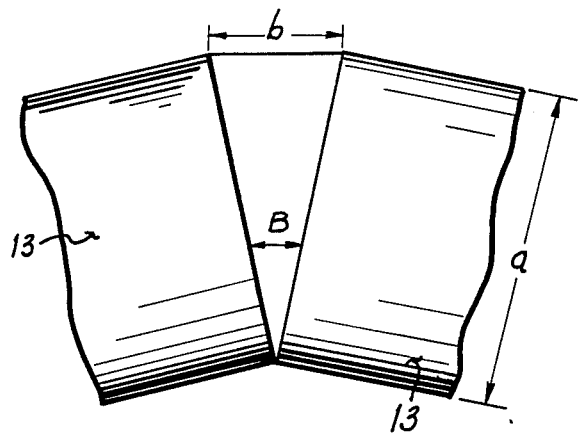
FIG. 3 is a diagram for approximating the angle of bend in the coupling.

By way of illustrating and providing a more complete appreciation of the present invention and many of the attendant advantages thereof, the following detailed description is given concerning the novel pipe coupling and methods of use thereof.

The pipe coupling 10 of this invention will find especially advantageous use in forming angled connections between sections of helically corrugated pipe of the type which has an end rolled annular corrugation. The angles of bend contemplated are generally those in the range of about 1°-20°. As noted previously, typical large pipe sections of this type to be connected by this coupling range in diameter from 24 inches to 120 inches and having a wall thickness that varies from 0.064 inch to 0.168 inch. The metal sheet coupling itself can have a thickness that varies over the same thickness of the pipes that are joined.

Referring now more particularly to the drawings in which like reference characters indicate like elements throughout, according to a preferred embodiment of the invention, a pipe coupling 10 is formed from a metal sheet of uniform width having a plurality of longitudinally extending intermediate folds and a longitudinally extending groove spaced from each of the longitudinal edges. The sheet is rolled in a longitudinal direction to form a generally cylindrical rigid sleeve in which transverse edges 11 are nearly abutting or overlapping as shown in FIG. 1. In this rolled shape, the sleeve has two ends 12, each end 12 having a diameter that is sized to receive a section of pipe 13 to be connected. For drainage pipe purposes the sleeve need not be completely sealed or bonded at its edges, but such edges are normally overlapped in use to maintain the fluid transporting capability of the pipes and make the connections soiltight.

After a pipe section 13 has been placed within each of the respective ends 12, one of the edges of the generally cylindrical rigid sleeve is pulled to overlap the other edge, thereby forming a rigid sleeve connecting the pipe sections 13. The coupling 10 is further tightened to provide a secure fit about the ends of the pipe sections. This fit may be subsequently maintained by welds or couplings similar to the type disclosed in FIG. 3 of the Boynton patent.

In order to make the connections soil tight, radial compression may be applied by tightening bands 17 around the outer circumference of the rigid sleeve adjacent the ends 12. As shown in FIG. 2, according to a preferred embodiment of the invention, the bands 17 are located within annular grooves 18 at opposite ends of the pipe coupling 10 which are seated within corresponding annular grooves 19 at the ends of the joined sections of pipe 13. The seal between the pipe coupling 10 and the pipe sections 13 may be further improved by placing O-rings (not shown) between the engaging surfaces. Other types of bands may be used to seal the connections between the coupling and the pipe sections, as shown in the above-mentioned Boynton U.S. Pat. No. 3,501,179, which is expressly incorporated herein by reference in its entirety. Thus, a rigid straight line connection between two pipe sections has been achieved.

Intermediate each of the ends 12, the pipe coupling 10 has integrally formed expansible and contractible means capable of being bent under the application of force to accommodate a desired angle of connection. FIG. 1 depicts one embodiment of this invention, with accordion-like folds 25 forming the expansible and contractible means. These accordion-like folds 25 bend when opposing moments are applied about an axis 26 extending through the center of the coupling and perpendicular to an axis 27 that is longitudinal to the rigid sleeve. The applied moments transform the pipe coupling 10 from an unbent rigid sleeve to a modified, rigid sleeve which accommodates the desired angle of connection. The modified sleeve has the same rigid characteristics of an unbent sleeve and is suitable for maintaining the structural integrity of a steel corrugated pipeline. The angle of bend that can be accommodated is determined by the expandability and contractibility of the pipe coupling 10.

The table and equations below can be used to approximate the maximum angle of bend (i.e., variation from a 180° straight line connection) for a pipe coupling 10 with known expansible and contractible capabilities, designated dimensionally as e and c respectively. If the coupling shown in FIG. 2 were removed and the pipe sections 13 were moved together so that the bottom (as viewed in FIG. 2) edges were abutting while the pipes maintained the same relative angular disposition, the top edges would be separated by a distance of c−e, designated as b. Thus, the diameter of the pipe sections and the distance between the top edges, designated as a and b respectively, form the legs of a triangle, diagrammatically shown in FIG. 3. For relatively small angles of bend, typical for routing of steel corrugated pipe, this triangle approximates a right triangle in which the angle opposite leg b corresponds to an angle of bend, designated as B.

Substitution into the following equations provides approximations for the maximum value of B of FIG. 3 using a pipe coupling formed from a sheet having a uniform width of 18¾ inches. For such a coupling, a typical value for e is 6.5 inches and a typical value for c is 1 inch to provide a b value of 5.5 inches. By substituting diameters ranging from 24" to 120" into equation (1) (below) a maximum angle of bend B for this pipe coupling can be determined.

(1) $\tan A = \frac{a}{b} = \frac{120}{5.5} = 21.8181$ (2) $A = 87°23'$  $B = 90° - A$
$B = 90° - 87°23' = 2°37'$
$B = 2°37'$

| DIA | MAXIMUM ANGLE OF BEND "B" |
| --- | --- |
| 120" | 2°37' |
| 110" | 2°52' |
| 96" | 3°17' |
| 90" | 3°30' |
| 84" | 3°45' |
| 78" | 4°2' |
| 72" | 4°22' |
| 66" | 4°46' |
| 60" | 5°12' |
| 54" | 5°40' |
| 48" | 6°32' |
| 42" | 7°28' |
| 36" | 8°41' |
| 30" | 10°23' |
| 24" | 12°55' |

As shown in the table, for a fixed distance b, the maximum angle of bend increases as the diameter of the pipe decreases. For a fixed diameter of pipe, a greater b value accommodates a larger angle of bend. The value for b depends upon the resiliency of the material used to form the pipe coupling 10, the width of the original sheet, the number of accordion-like folds 25 and the dimensions of the folds 25.

The pipe coupling 10 of this invention significantly reduces the time required to form an angled connection in the field. Furthermore, regardless of the desired angle of connection, the procedure for installing the pipe coupling 10 of this invention remains the same. To achieve the desired bend, pipe sections 13 are secured within the generally cylindrical ends 12 of the pipe coupling 10 as described previously. With a straight line connection formed and one of the pipe sections 13, held in an immovable position, the other pipe section 13 may be used as a lever to bend the pipe coupling 10 to the desired angle. The leverage provided by an elongated pipe section 13 securely connected to the pipe coupling 10 enables opposing moments of increased magnitude to be applied about axis 26. This results in a bending of the accordion-like folds 25 as shown in FIG. 2. Depending upon the performance requirements for the particular application, the pipe coupling 10 and the bands 17 may be further tightened after this leveraged bending has taken place.

It should be appreciated that the pipe coupling of this invention permits variations in the resulting connection which is formed between pipe sections at an angle. The present embodiments are, therefore, to be considered in all respects as illustrative and not restrictive and any changes coming within the meaning and equivalency range of the appended claims are to be embraced therein.

What is claimed is:

1. A rigid metal pipe coupling for joining drainage pipe ends having a corrugation at each of said ends, said coupling comprising a sheet of metal having opposite edges for rolling into a generally cylindrical rigid sleeve, said opposite edges of said rolled sleeve being overlapped and free to expand and contract in a circumferential manner, means formed at each end of the sleeve for cooperatively engaging said corrugation of each said pipe end, said sheet having an integrally formed expansible and contractible means formed intermediate the ends of the sheet, said means adapted after rolling said edges into said sleeve and under the action of a predetermined force to expand and contract thereby permitting said sleeve to permanently bend and accommodate a desired angle of rigid connection between said joined pipe ends.

2. The pipe coupling of claim 1 wherein said integrally formed expansible and contractible means comprises accordion-like folds formed in said metal sheet.

3. The pipe coupling of claim 1 wherein said sleeve joins pipe ends having a diameter from about 24 inches to about 120 inches.

4. The pipe coupling of claim 1 wherein said pipe to be joined is formed of galvanized steel and has a thickness from about 0.064 inch to about 0.168 inch.

5. The pipe coupling of claim 1 wherein said pipe is lined with high strength concrete.

6. The coupling of claim 1 wherein each said cooperatively engaging means is an annular groove formed in said sleeve end.

7. The coupling of claim 6 further comprising a tightening band for encircling said sleeve and forming said rigid coupling.

8. A rigid metal drainage pipe coupling for joining pipe ends having a corrugation at each of said ends having large diameters on the order of about 24 to about 120 inches, said metal pipe coupling comprising a sheet of metal having opposite edges for rolling into a generally cylindrical rigid sleeve, said opposite edges of said rolled sleeve being overlapped and free to expand and contract in a circumferential manner, means formed at each end of the sleeve for cooperatively engaging said corrugation of each said pipe end, said sheet having integrally formed accordion-like folds intermediate the ends of the sheet, said folds adapted after rolling into said sleeve and under the action of a predetermined force to expand and contract thereby permitting said sleeve to permanently bend and accommodate a desired angle of rigid connection between said joined pipe ends.

9. A method of rigidly joining drainage pipe ends having a corrugation at each of said ends to form a fluid transporting pipeline comprising the steps of:
   providing a metal sheet having opposite edges for rolling and overlapping into a generally cylindrical rigid sleeve, said opposite edges of said rolled sleeve being overlapped and free to expand and contract in a circumferential manner, means formed at each end of the sleeve for cooperatively engaging said corrugation of each said pipe end, said sheet having integrally formed expansible and contractible means intermediate its ends, said means adapted after rolling said edges into said sleeve and under the action of a predetermined force to expand and contract thereby permitting said sleeve to permanently bend and accommodate a desired angle of rigid connection between said pipe ends;

forming said sleeve and cooperatively engaging each sleeve end means with a pipe end corrugation of said pipe section within each end of said sleeve;

applying said force to at least one of said pipe sections to expand and contract said sleeve and accommodate a desired angle of connection between said pipe sections while maintaining the fluid transporting capability of said pipe line.

10. The method of joining pipe ends as in claim 9 further comprising tightening said sleeve about said pipe ends to overlap said edges and thereby to circumferentially encircle said pipe ends.

* * * * *

UNITED STATES PATENT AND TRADEMARK OFFICE
CERTIFICATE OF CORRECTION

PATENT NO. : 4,865,357
DATED : September 12, 1989
INVENTOR(S) : O'Dell Brinegar

It is certified that error appears in the above-identified patent and that said Letters Patent is hereby corrected as shown below:

Col. 5, line 18, "$A = 87°23'\quad B = 90' - A$" should be $\quad\quad --A = 87°23'\quad B = 90° - A--$ Signed and Sealed this Twenty-first Day of August, 1990

*Attest:*

HARRY F. MANBECK, JR.

*Attesting Officer*  *Commissioner of Patents and Trademarks*